July 25, 1939.  L. YOST  2,167,019
AUTOMATIC CLUTCH FOR DRILLING APPARATUS
Filed Nov. 1, 1937

Lloyd Yost
INVENTOR.

BY *Irvin A. Andrus*
ATTORNEY.

Patented July 25, 1939

2,167,019

UNITED STATES PATENT OFFICE 2,167,019

AUTOMATIC CLUTCH FOR DRILLING APPARATUS

Lloyd Yost, Wilmette, Ill., assignor to A. O. Smith Corporation, Milwaukee, Wis., a corporation of New York Application November 1, 1937, Serial No. 172,134

6 Claims. (Cl. 255—4)

This invention relates to a clutch for use with drilling apparatus wherein it is desired to operate the drill bit by means not integrally attached to the stem of the bit. In drilling deep wells, it is essential that such a clutch should be automatic because of the difficulty of controlling the clutch from the top of the well.

The clutch is specifically adapted for use with hydraulic drills in which the drill pipe is normally maintained stationary or practically so with regard to the driving shaft on which the drilling bit is mounted. Frequently it is desirable to use the drill pipe as the driving means and in this event a clutch is necessary to connect the drill pipe to the shaft carrying the drill bit.

It is an object of the present invention to provide an extremely simple automatic clutch for connecting the drill pipe to the drill shaft.

Another object of the invention is to utilize the mud or other fluid which is forced through the drill pipe as the force for holding the clutch out of engagement.

A further object of the invention is to provide a clutch which will automatically engage the drill stem when the mud pressure is removed.

A still further object is to provide an improved bearing surface between the clutch and drill shaft which insures long life to the mechanism and prevents the necessity of removing the drill from the well and opening the outer shell to repair worn out parts.

Reference is now made to the accompanying drawing which illustrates one embodiment of the invention. In the drawing.

Figure 1:
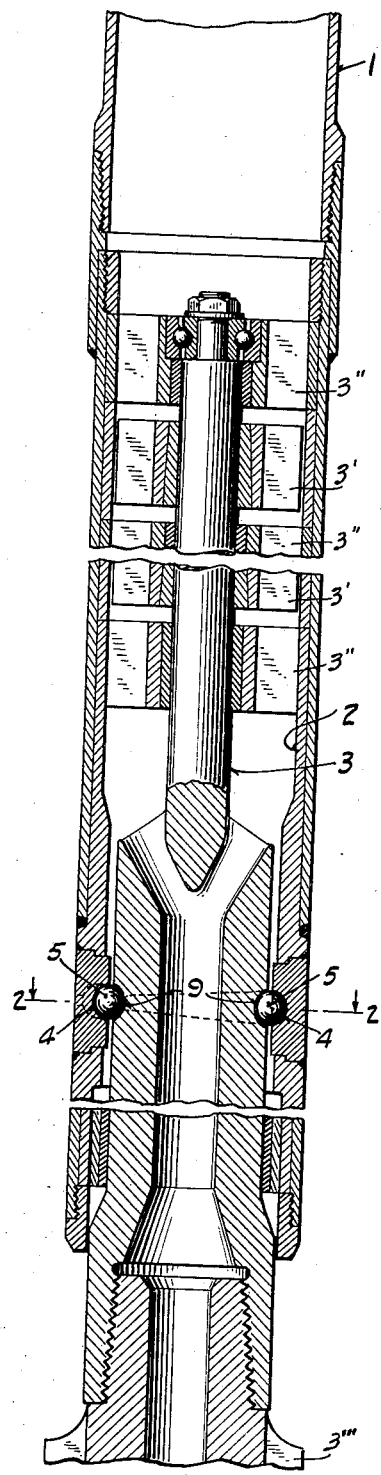
Figure 1 is a vertical central section, parts being broken away, showing the relation of the clutch with respect to the other parts of the drilling apparatus.

The drill pipe 1 extends from the top of the well to the housing 2 for the hydraulic turbine and serves as a conduit for the mud or other fluid circulated while drilling. The drill pipe may be rotated by any conventional means from the top of the well, but as this invention is specifically adapted for use with a hydraulic drill the major part of the drilling will be performed by the hydraulic motor disposed in housing 2.

The hydraulic motor consists of a number of turbine rotor blades 3' mounted on a drill shaft 3 and rotating between stator blades 3'' mounted on the housing 2 arranged within the housing. The fluid mud which is pumped through the system acts upon the blades to rotate the shaft and drive the drill bit 3'''. Any suitable connection between the stem of the bit and the drill shaft 3 may be employed.

The wall of the housing or drill shell is provided with an elongated recess or pocket 4 which contains a ball 5, for engaging the drill shaft. For convenience the pocket may be fabricated in a separate piece which is welded or otherwise secured in the body of the shell. In the drawing two such pockets are illustrated, arranged on opposite sides of the drill shaft, but any number, one or more, may be employed.

Each pocket recedes from the center of the drill shaft 3 in order that the ball, when at the outer extremity of the pocket may be completely removed from contact with any point on the surface of the shaft. At the outer end of the pocket there is a port 6 through the housing, having its axis approximately radial to the center of the spherically shaped contour of the end of the pocket and forming therein a valve seat for the ball. At the inner end of the pocket there is an abutment 7 for holding the ball 5 in clutching engagement as shown.

Figure 3:
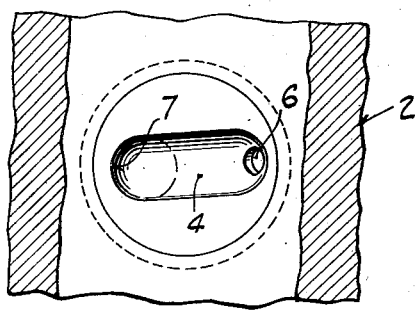
Fig. 3 is a section taken along the line 3—3 of Fig. 2.
Figure 4:
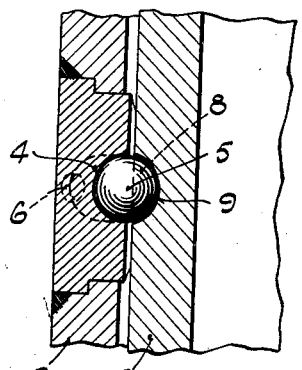
Fig. 4 is a vertical section taken along line 4—4 of Fig. 2.

Each recess 4 is inclined at a slight angle, as shown in Fig. 3 with the end having the port 6 slightly elevated with respect to the other end of the recess. Accordingly the ball 5 will normally roll to the lower end of the recess into engagement with the drill shaft unless held to the upper end of the recess by an internal pressure.

For each clutch, the drill shaft itself is provided with an abutment 8, in the shape of a spherical socket for contact with the ball when the clutch is in operation. A tapered surface 9 on the shaft merging from the base of the abutment 8 gradually forces the ball into the recess 4 when the drill shaft is rotated ahead of the housing.

With the ball in the position shown on the drawing, if the outer shell be rotated in the direction of the arrow shown thereon there will be a clutching or driving action between it and the drill shaft. This is a direct pressure with the ball acting as a strut between the driving abutment 7 and the driven abutment 8. The pressure is distributed over a considerable area of the surfaces of the shell and shaft as both of the abutments 7 and 8 are spherical sockets complementary to the ball. In this respect the invention constitutes a decided improvement over the ordinary rolling clutch which operates by pinching action with a highly concentrated pressure on the connecting members.

Figure 2:
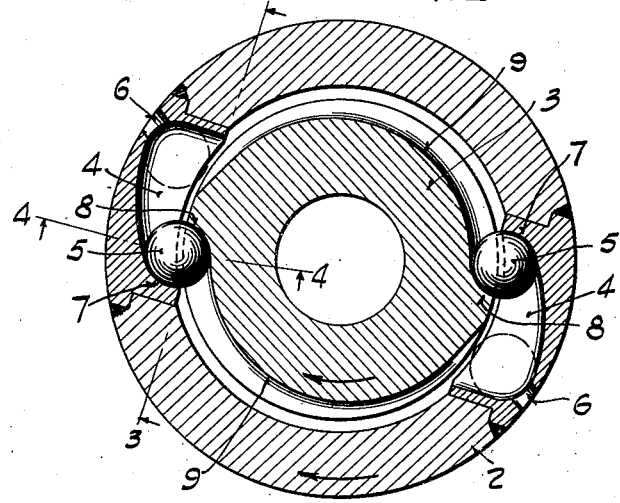
Fig. 2 is a cross section taken along the line 2—2 of Fig. 1 and represents the clutch in detail.

When the drill shaft is rotated in the direction of the arrow shown thereon, with the drill shell relatively at rest, the inclined surface 9 on the drill shaft rolls the ball into the position shown by the dotted lines in Fig. 2. In such position the drill shaft has complete clearance of the clutching means. Meanwhile the drilling mud in the space between the shaft and the shell is under pressure greater than that outside of the shell in the well, and due to the port 6 the ball 5 is forced onto the seat formed by said port and held at the end of the pocket. As long as the drill shaft is operated by the turbine the clutch will remain out of contact with the shaft.

If and when it is desirable to drive the drill shaft by mechanical power, as by the drill pipe leading to the top of the well, the flow of mud is reduced or entirely stopped and each ball automatically rolls into engagement between the two principal members. In this manner, the clutch becomes engaged when the drill shell is driven ahead of the drill shaft, and disengages when the shaft rotates ahead of the shell.

The invention having been described, what is claimed is:

1. In a well drilling apparatus, a drill pipe, a drill bit rotatably attached at the lower end thereof, a clutch for connecting said drill pipe to said drill bit, and fluid pressure means responsive to the flow of drilling fluid through the apparatus for holding said clutch member in disengagement.

2. In apparatus of the class described, a driving member, a driven member, and means for controlling a clutch member therebetween, comprising a pocket in one of said members for receiving the clutch member, said pocket having an opening at one end thereof and fluid pressure means for holding said clutch member against said opening when disengaged.

3. In a well drilling apparatus in which the drill shaft is normally driven by a hydraulic motor actuated by drilling fluid forced through the apparatus, means for actuating the drill shaft by a drill pipe leading to the top of the well, such means comprising a clutch and fluid pressure means for maintaining said clutch in disengagement during the flow of drilling fluid through said motor.

4. In a well drilling apparatus, a drill pipe, a drill shell attached to the lower end thereof, a hydraulic motor housed in said shell, a drill shaft driven by said hydraulic motor and driving a drill bit, a clutch member connecting said shell to said shaft, a pocket disposed within the drill shell for retaining said clutch member, the walls of said pocket engaging said clutch member to hold the same in clutching engagement when said clutch member is at one end of said pocket, and means responsive to the flow of drilling fluid through said motor for holding said clutch member in disengagement when the clutch member is at the other end of said pocket.

5. In a well drilling apparatus, the combination of a drill pipe, a drill shell at the lower end thereof, a drill shaft rotatable within said drill shell and carrying a drill bit, and a clutch member connecting said drill shell to said drill shaft, said drill shell having a pocket inclined to the horizontal for carrying said clutch member into engagement with said shaft, and said shaft having on its periphery an abutment to engage said clutch member when said drill shell drives said shaft, and having its surface from the base of the abutment tapered outwardly to force said clutch member into said pocket and out of engagement with said shaft when said shaft is rotated ahead of said shell.

6. In a well drilling apparatus, the combination of a drill pipe, a drill shell at the lower end thereof, a drill shaft rotatable within said drill shell and carrying a drill bit, a substantially spherical clutch member disposed between said drill shell and said drill shaft, a pocket in said drill shell for receiving said clutch member and being of varying depth for forcing said member against said drill shaft for driving the same, an abutment on said shaft for engaging said clutch member when in driving position, and fluid pressure means for holding said member in the deeper portion of said pocket when the same is disengaged from the drill shaft.

LLOYD YOST.